Dec. 19, 1944.  W. H. SHORTELL  2,365,301
HACK SAW BLADE
Original Filed June 15, 1939
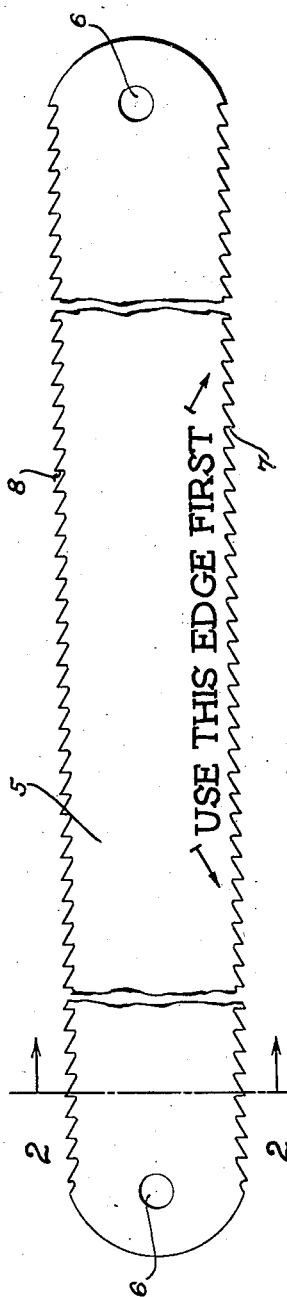
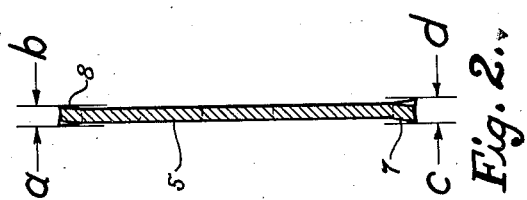
INVENTOR
William H. Shortell
ATTORNEY Patented Dec. 19, 1944

2,365,301

UNITED STATES PATENT OFFICE 2,365,301

HACK SAW BLADE

William H. Shortell, Greenfield, Mass., assignor to Millers Falls Company, Greenfield, Mass., a corporation of Massachusetts Continuation of application Serial No. 279,251, June 15, 1939. This application June 1, 1940, Serial No. 338,290

5 Claims. (Cl. 29—95)

This invention relates to hack saws, and more particularly to a hack saw blade which by virtue of its construction and arrangement of teeth, has a much greater life than those heretofore used.

The application is a continuation of my application entitled "Hack saw blade," filed June 15, 1939, Serial No. 279,251.

An object of the invention is to provide a double-edged hack saw blade which will not be appreciably more expensive to manufacture than conventional single-edged blades but will be capable of doing twice as much work.

Another object is to provide such a blade as a finished product and to provide means for protecting the unused teeth from damage from the sides of the kerf cut by the edge first used.

Other objects and advantages will in part appear and in part be pointed out in the course of the following description of one embodiment of the invention, which is given as a non-limiting example in connection with the accompanying drawing, in which:

Fig. 1 is a broken view in side elevation showing a hack saw blade constructed in accordance with the invention;

Fig. 2 is an enlarged sectional view on approximately the line 2—2 in Fig. 1.

As shown in Fig. 1 the saw blade comprises a flat strip 5 of metal provided with holes 6 at the ends thereof, for attaching the blade in a saw frame, and rows of teeth 7 and 8 on opposite edges of the strip.

Both rows of teeth are set and ready for sawing. The important distinction between the two rows is that teeth 7 are set to a greater degree than teeth 8, as is shown in Fig. 2. By this it is meant that the distance cd across teeth 7 is greater than the distance ab across teeth 8.

It is intended that when a new blade is put to use, teeth 7 be used first and worked until they are worn out before teeth 8 are used at all. During this first period of use, the wider set of teeth 7 assures their cutting a kerf sufficiently wide to provide clearance for teeth 8 to save them from being damaged against the sides of the kerf. This also prevents binding of the saw blade. When teeth 7 are worn out, the blade is turned over and teeth 8 are put to use. By this time teeth 7 will be worn substantially the same width as teeth 8, so they will fit within the kerf cut by the latter. Even if they are still slightly wider, they will quickly be flattened by friction against the sides of the kerf, which of course no longer matters, inasmuch as they are already useless for further sawing.

In order to insure proper use of a blade having the double row of teeth, it is proposed to stamp or otherwise mark on each blade a suitable legend indicating the wider set teeth. For example, there is shown in Fig. 1 the legend "Use This Edge First" marked on the blade adjacent to teeth 7, with indicating arrows pointing to the teeth 7. Obviously this legend may be varied in different ways, and the arrows may or may not be used as desired.

The difference in set between teeth 7 and teeth 8 may vary depending upon the size of the saw, the general range being about .005 to .010 inch. As an illustrative example, assume that the blade in Figs. 1 and 2 is a standard blade of 14 inch length, the distance between the centers of holes 6 being 13½ inches. Satisfactory figures for the other dimensions have been found to be .065 inch for thickness through the middle of the blade, .090 inch for the distance cd and .085 inch for the distance ab.

Blades constructed as described above have been found to be satisfactory under all types of use. Inasmuch as the wider set teeth cut a kerf sufficiently wide to provide clearance for the other row of teeth, the latter remain in perfect condition until the first row is worn down to the point of uselessness. Since double life for the blade can be secured by adding the inexpensive operations of milling and setting the reverse edge, a very substantial saving is achieved.

From the foregoing detailed description, it will be understood that the invention is not limited, necessarily, to the specific details of the construction as are herein specifically illustrated and described, as it will be apparent that such details are subject to various modifications which will become apparent readily to one skilled in the art, without departing from the spirit of the invention; and it will be understood, therefore, that it is intended and desired to include within the scope of the invention such modification and changes as may be necessary to adapt it to varying conditions and uses.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. As a new article of manufacture, a hack saw blade provided with cutting teeth of substantially the same size and shape along both edges thereof, the teeth along one edge being set so as to have a width of approximately .090 inch and the teeth along the other edge being set to have a width of approximately .085 inch.

2. As a new article of manufacture, a hack saw blade provided with cutting teeth of substantially the same size and shape along both edges thereof, the teeth along one edge being set to a lesser degree than the teeth along the other edge, and means for indicating the edge bearing the teeth having the greater degree of set.

3. As a new article of manufacture, a hack saw blade provided with cutting teeth of substantially the same size and shape along both edges thereof, the teeth along one edge being set to a lesser degree than the teeth along the other edge, said blade having thereon a legend designating the edge bearing the teeth having the greater degree of set as the edge to be first used for sawing.

4. As a new article of manufacture, a hack saw blade provided with cutting teeth of substantially the same size and shape along both edges thereof, said teeth being set and ready for sawing, the teeth along one edge being set in the order of .005–.010 inch wider than the teeth along the other edge.

5. As a new article of manufacture, a hack saw blade provided with cutting teeth of substantially the same size and shape along both edges thereof, both rows of teeth being set and ready for sawing, the teeth along one edge being set to a lesser degree than the teeth along the other edge.

WILLIAM H. SHORTELL.